US011216082B2

(12) United States Patent
Rolion et al.

(10) Patent No.: US 11,216,082 B2
(45) Date of Patent: Jan. 4, 2022

(54) ACTIVE STYLUS

(71) Applicant: SOCIETE BIC, Clichy (FR)

(72) Inventors: Franck Rolion, Asnieres sur Oise (FR); Loïc Folgoas, Paris (FR); Etienne Roudaut, La Garenne Colombes (FR); Ludovic Fagu, Noisy le Sec (FR)

(73) Assignee: Societe Bic, Clichy (FR)

( * ) Notice: Subject to any disclaimer, the term of this patent is extended or adjusted under 35 U.S.C. 154(b) by 0 days.

(21) Appl. No.: 16/772,486

(22) PCT Filed: Dec. 12, 2018

(86) PCT No.: PCT/EP2018/084584
§ 371 (c)(1),
(2) Date: Jun. 12, 2020

(87) PCT Pub. No.: WO2019/115625
PCT Pub. Date: Jun. 20, 2019

(65) Prior Publication Data
US 2020/0401239 A1    Dec. 24, 2020

(30) Foreign Application Priority Data
Dec. 14, 2017 (EP) ................... 17306777

(51) Int. Cl.
*G06F 3/0346* (2013.01)
*G06F 3/0354* (2013.01)
*G06F 3/044* (2006.01)

(52) U.S. Cl.
CPC ........ *G06F 3/0346* (2013.01); *G06F 3/03545* (2013.01); *G06F 3/044* (2013.01)

(58) Field of Classification Search
CPC .... G06F 3/0346; G06F 3/03545; G06F 3/044; G06F 3/0383
See application file for complete search history.

(56) References Cited

U.S. PATENT DOCUMENTS

| RE34,095 E | * | 10/1992 | Padula | ............... G06F 3/03545 |
| | | | | 178/19.04 |
| 5,629,500 A | * | 5/1997 | Fukuzaki | ........... G06F 3/03545 |
| | | | | 178/19.07 |

(Continued)

FOREIGN PATENT DOCUMENTS

EP    3258350 A1    12/2017

OTHER PUBLICATIONS

International Search Report and Written Opinion issued in International Application PCT/EP2018/084584, dated May 28, 2019 (25 pages).

*Primary Examiner* — David D Davis
(74) *Attorney, Agent, or Firm* — Bookoff McAndrews, PLLC

(57) ABSTRACT

A stylus for touchscreen includes a barrel extending in a longitudinal direction, the barrel including a first end including an opening and a second end, the first end and the second end being, in the longitudinal direction, opposite one another, and a first part and a second part, the first part including the first end and the second part including the second end, an electronic tip received at least in part in the barrel and configured to have at least an in-use configuration in which the electronic tip protrudes from the first part of the barrel through the opening, at least two actuators positioned in a circumferential direction on the second part of the barrel, each actuator being configured to be actuated independently from the other actuators and having at least two configurations, at least a detector for detecting the configuration of the actuators, and communication components.

19 Claims, 8 Drawing Sheets

(56) References Cited

U.S. PATENT DOCUMENTS

| | | | | |
|---|---|---|---|---|
| 5,969,296 A * | 10/1999 | Yamamoto | G06F 3/03545 | 178/18.01 |
| 8,345,023 B1 * | 1/2013 | Drennan | G06F 3/03545 | 345/179 |
| 8,803,850 B2 * | 8/2014 | Griffin | G06F 3/03545 | 345/179 |
| 2004/0140963 A1 * | 7/2004 | Kim | G06F 3/03545 | 345/179 |
| 2006/0282486 A1 * | 12/2006 | Bhavnani | B43K 29/00 | 708/160 |
| 2008/0030486 A1 * | 2/2008 | Cook | G06F 3/03545 | 345/179 |
| 2008/0238887 A1 * | 10/2008 | Love | G06F 3/03545 | 345/179 |
| 2009/0238451 A1 * | 9/2009 | Fuse | G06F 3/03545 | 382/165 |
| 2012/0086664 A1 * | 4/2012 | Leto | G06F 3/03545 | 345/174 |
| 2014/0267147 A1 * | 9/2014 | Buelow | G06F 3/03545 | 345/174 |
| 2014/0267180 A1 * | 9/2014 | Buelow | G06F 3/03545 | 345/179 |
| 2015/0193027 A1 * | 7/2015 | Robinson | G06F 3/03545 | 345/179 |
| 2016/0162048 A1 * | 6/2016 | David | G06F 1/1626 | 345/179 |
| 2016/0282970 A1 * | 9/2016 | Evreinov | G06F 3/016 | |
| 2016/0364023 A1 * | 12/2016 | Bathiche | G06F 3/03545 | |
| 2017/0068342 A1 * | 3/2017 | Zimmerman | G06F 3/0383 | |
| 2017/0090605 A1 * | 3/2017 | Horie | G06F 3/03545 | |
| 2017/0108949 A1 * | 4/2017 | Barel | G06F 3/03545 | |
| 2017/0108954 A1 * | 4/2017 | Tang | G06F 3/0383 | |
| 2017/0239977 A1 * | 8/2017 | Yeh | G06F 3/03545 | |
| 2017/0285766 A1 * | 10/2017 | Omura | G06F 3/0428 | |
| 2017/0361639 A1 * | 12/2017 | Kaneda | G06F 3/03545 | |

* cited by examiner

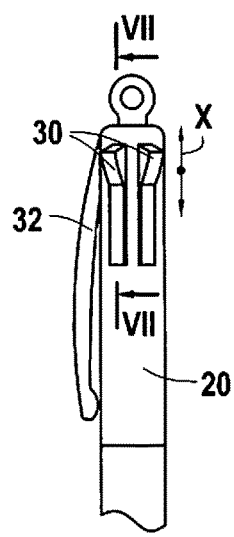
FIG.6
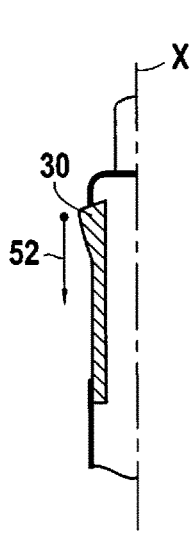
FIG.7A FIG.7B FIG.7C
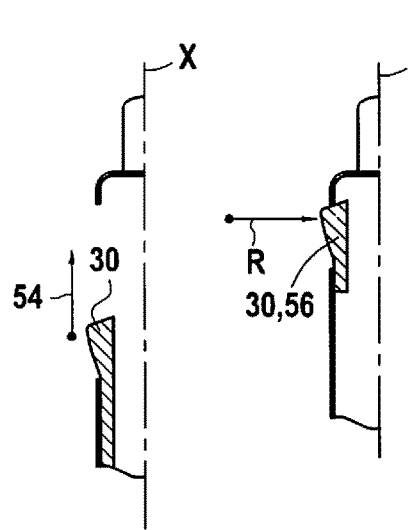
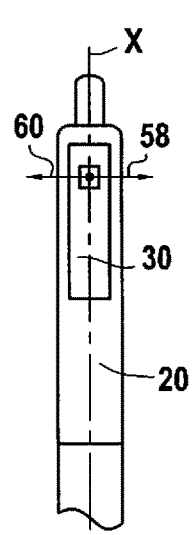
FIG.7D
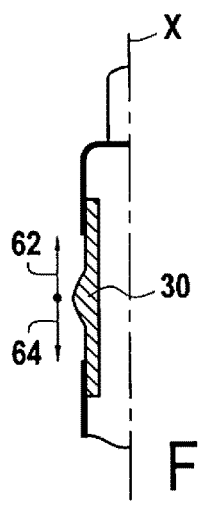
FIG.8
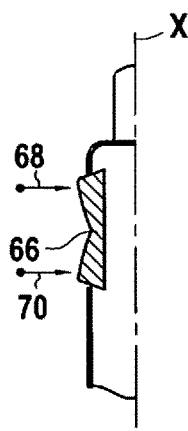
FIG.9
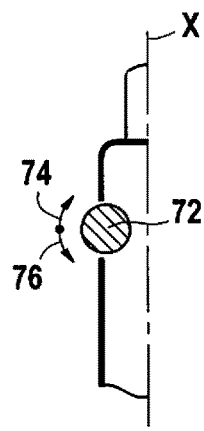
FIG.10
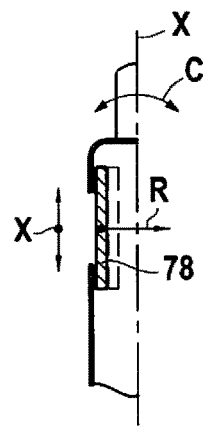
FIG.11
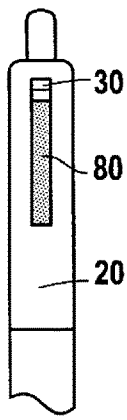
FIG.12A
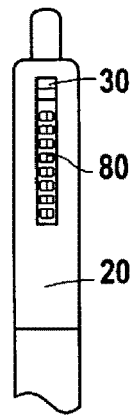
FIG.12B
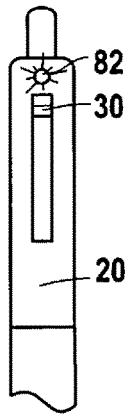
FIG.13

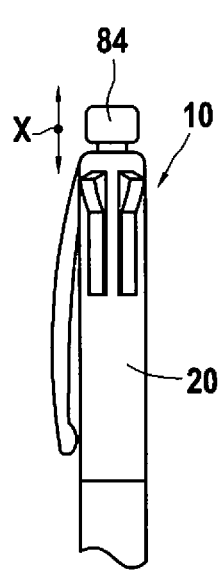 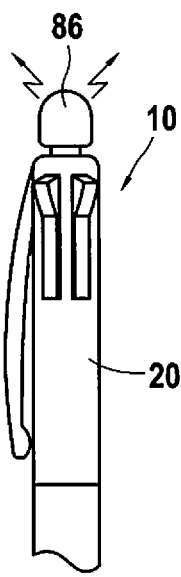 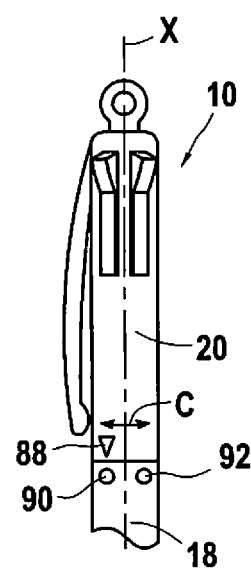 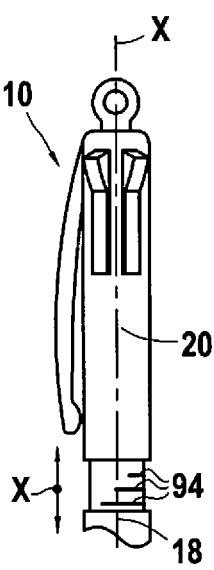
FIG.14   FIG.15   FIG.16   FIG.17
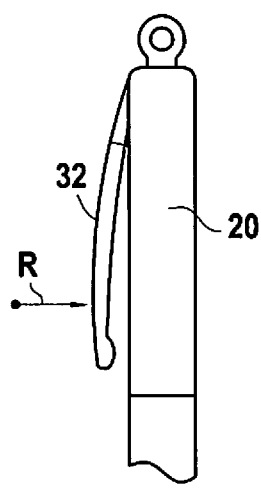 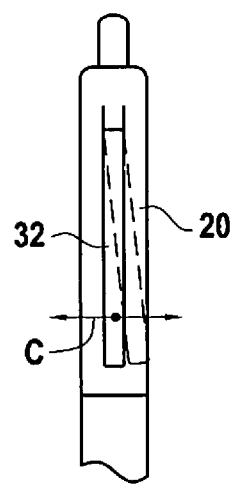
FIG.18A   FIG.18B

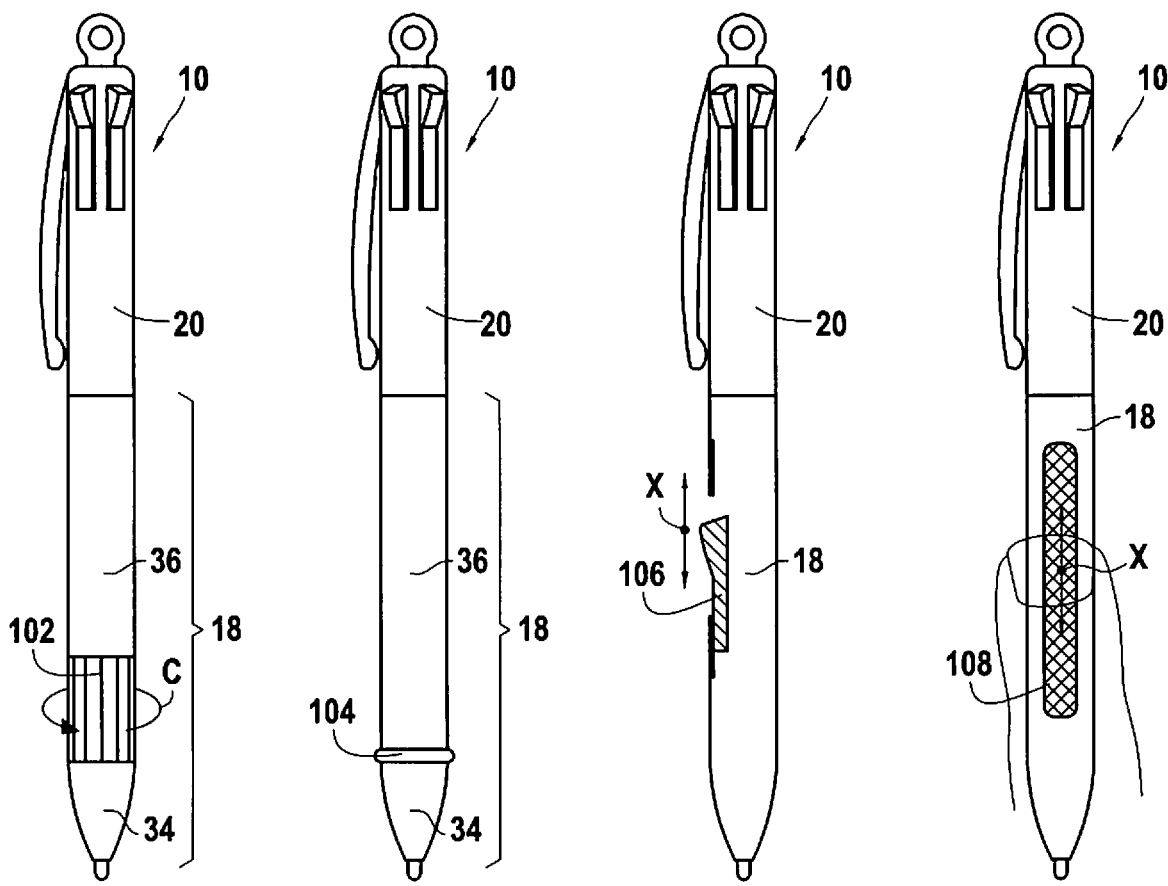
FIG.21A  FIG.21B  FIG.21C  FIG.21D
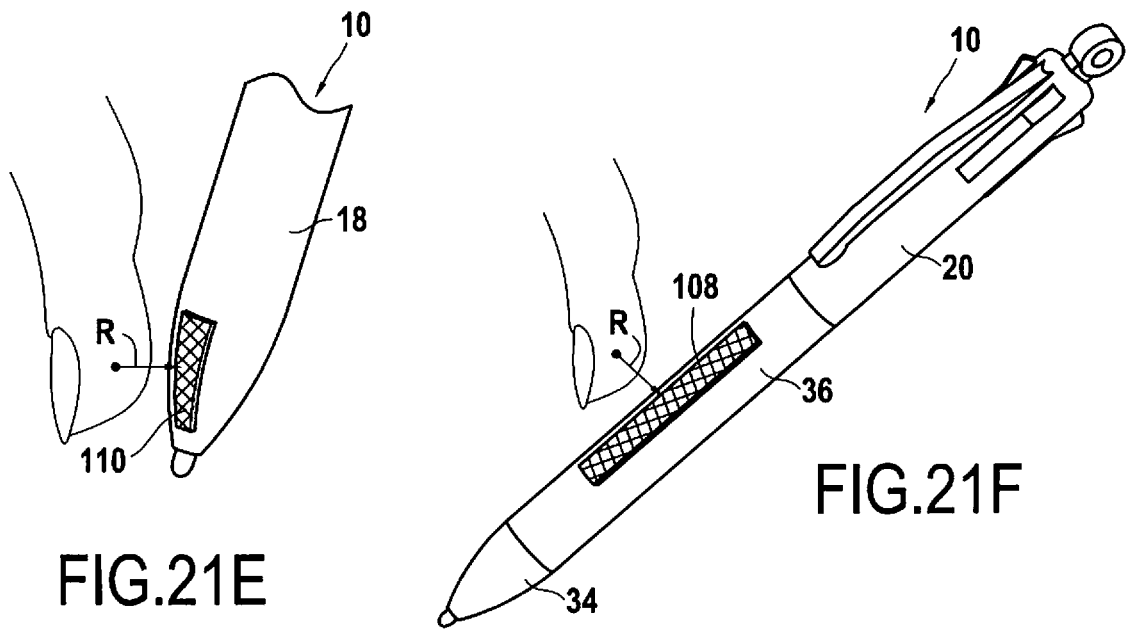
FIG.21E
FIG.21F

ACTIVE STYLUS

CROSS REFERENCE TO RELATED APPLICATION(S)

This application is a National Stage Application of International Application No. PCT/EP2018/084584, filed on Dec. 12, 2018, now published as WO2019/115625 and which claims priority to European Application No. EP17306777.8, filed on Dec. 14, 2017.

TECHNICAL FIELD

The present disclosure is related to a stylus for touchscreen, and more particularly to a stylus comprising a tip configured to cooperate with a touchscreen.

BACKGROUND

Styluses interacting with touch screen are known. Such styluses generally comprise one button allowing the user to interact with the touchscreen and/or software in the electronic device including the touchscreen.

However, such interaction is relatively limited and the ergonomics of the button are not well tailored and/or the precision of the positioning of the stylus lack accuracy.

SUMMARY

Therefore, according to embodiments of the present disclosure, a stylus for touchscreen is provided. The stylus includes a barrel extending in a longitudinal direction, the barrel including a first end including an opening and a second end, the first end and the second end being, in the longitudinal direction, opposite to one another, and a first part and a second part, the first part including the first end and the second part including the second end. The stylus includes an electronic tip received at least in part in the barrel and configured to have at least an in-use configuration in which the electronic tip protrudes from the first part of the barrel through the opening, at least two actuators positioned in a circumferential direction relative to one another on the second part of the barrel, each actuator extending in the longitudinal direction, being configured to be actuated independently from the other actuators and having at least two configurations, at least a detector for detecting the configuration of the actuators, and communication components configured to send information relative to the configuration of the actuators.

By providing such a stylus, it is possible to have a multi-actuator stylus, the actuators being disposed on the second part of the barrel, i.e. not the part generally held by a user when using the stylus with a touchscreen.

The electronic tip may be received at least in part in the barrel and being configured to have at least an in-use configuration in which the electronic tip protrudes from the first part of the barrel through the opening, the stylus may be a fixed tip stylus or a retractable tip stylus.

The actuators may be disposed on the second part of the barrel, the unintentional actuation of the actuators is reduced, if not avoided. Moreover, the actuators may be actuated with the thumb while the user still holds the stylus in his/her hand.

Furthermore, the actuators may be positioned in a circumferential direction relative to one another, to actuate one actuator in particular, the user may turn the stylus in his/her hand in the circumferential direction, so the actuator may be actuated with the thumb without interfering with the other actuator.

These actuation movements are relatively natural and the ergonomics of such actuation movements is very much improved.

The detector may detect the configuration of all actuators or each actuator may be connected, directly or indirectly, to one detector. Alternatively, more than one actuator but not all actuators may be connected, directly or indirectly, to one detector, i.e. one detector may detect the configuration of one actuator or the configuration of several actuators or the configuration of all actuators. It is understood that the detector detects the configuration of the actuators and not the end tip.

Thanks to the at least two actuators, it is possible to increase the interactions between the stylus and the touchscreen.

The actuators may be momentary actuators and/or permanent actuators. A momentary actuator is an actuator that, upon actuation, triggers a pulse, while a permanent actuator is an actuator that, upon actuation, changes from one state to another, for example from the "on" state to the "off" state.

In some embodiments, the actuator is a on/off actuator

In some embodiments, the electronic tip comprises an end tip.

The electronic tip is an assembly of an end tip connected to electronic components. The electronic components are connected to the detector. The electronic components may improve the detection of the position of the end tip relative to the touchscreen.

The electronic components also may include communication components configured for communication with a device comprising a touchscreen.

The communication between the device and the stylus may be a wireless communication, such as electromagnetic waves, for example, WiFi, Bluetooth, Near Field Communication (NFC), or such as light waves, for example, LiFi, infrared, or mechanical waves, for example ultrasound waves or audible sounds. The communication between the device and the stylus may be done directly from the stylus tip to the touchscreen when the touchscreen is a capacitive touchscreen. The communication between the device and the stylus may be done directly between the stylus coil and touchscreen coil when the touchscreen is an inductive touchscreen. These communication means are given as non-limitative examples.

In some embodiments, the end tip is detachable.

The end tip may be detached from the stylus and may be replaced by another end tip. The other end tip may have a different end tip shape and/or size. The other end tip may be made of a different material and/or have a different density so the feeling of the user is different from the feeling with the previous end tip.

In some embodiments, the end tip is a conductive material.

The stylus may cooperate with a capacitive touchscreen or any type of touchscreen cooperating with a conductive end tip. The electronic components allow for the power supply of the end tip in conductive material. Thanks to the power supply of the end tip, the end tip may be smaller and have a better accuracy positioning compared to a conductive pad that is not power supplied.

In some embodiments, the stylus comprises a pressure sensor tip unit.

The pressure sensor tip unit allows for recording the pressure applied by a user to the end tip of the stylus. This information may be transmitted to the unit comprising the touchscreen, so that a thickness of the line drawn on the touchscreen is proportional to the pressure exerted on the end tip, i.e., the greater the pressure, the greater the thickness of the line drawn.

In some embodiments, the second end comprises an actuator.

In some embodiments, the second end comprises an electric conductive pad or an end electronic tip.

In some embodiments, the second part comprises a clip, the clip being an actuator and/or the clip comprising a display.

The display may be a LED, a screen display, such as a LCD screen display or a E-Ink display.

In some embodiments, the first part of the barrel comprises an actuator.

The actuator may be disposed on the first part of the barrel. The first part of the barrel may comprise more than one actuator.

In some embodiments, at least one actuator is configured to be actuated in the longitudinal direction.

In some embodiments, at least one actuator is configured to be actuated in translation or in rotation.

In some embodiments, at least one actuator is configured to be actuated in the circumferential direction.

In some embodiments, at least one actuator is configured to be actuated in a radial direction.

In some embodiments, the actuation of the actuator is a displacement of the actuator.

In some embodiments, the barrel and/or at least one actuator has a touch sensitive surface.

For example, the surface of the actuator or of the barrel may be a capacitive surface or a resistive surface. In these embodiments, the actuation is a displacement of an external object relative to the actuator.

In some embodiments, the surface of the actuator or of the barrel is a two-dimension actuator.

For example, the surface of the actuator or of the barrel may have a capacitive matrix or a resistive matrix.

In some embodiments, the barrel and/or at least one actuator comprises a display.

The display may be a LED, a screen display, such as a LCD screen display or a E-Ink display.

In some embodiments, at least one actuator is a push button.

In some embodiments, at least one actuator is a slide button.

In some embodiments, at least one actuator is a rotating actuator.

In some embodiments, the rotating actuator is a ring.

In some embodiments, the rotating actuator is a wheel.

In some embodiments, at least one actuator is a rocker switch.

In some embodiments, at least one actuator is a time proportional selector.

The time proportional selector may be implemented with any type of actuator.

In some embodiments, at least one actuator is stable in each configuration.

The actuator is stable in each configuration it may take.

In some embodiments, at least one actuator is not stable in each configuration.

The actuator has a default configuration which the actuator takes back after actuation without interaction with a user. The stylus may comprise a biasing element for returning the actuator in a stable configuration.

In some embodiments, the actuator is a proportional actuator.

The actuator is stable in each configuration it takes. For example, the actuator may be based on variation of electrical resistance, of electrical capacity or of induction.

In some embodiments, the stylus comprises a motion detector.

The motion detector may be an inertial measurement unit ("IMU") allowing for measuring the orientation and the movement with nine degrees of freedom. Such an inertial measurement unit comprises accelerometer with three degrees of freedom, a gyroscope with three degrees of freedom and a magnetometer with three degrees of freedom. The IMU may be used as an improved inclination detector.

In some embodiments, the stylus comprises an inclination detector.

In some embodiments, the inclination detector is a tilt switch.

In some embodiments, the inclination detector comprises a moving part.

In some embodiments, the inclination detector is a gyroscope.

In some embodiments, the stylus comprises a battery.

The battery is the power supply source of the electronic components. It may also supply power to the detector. The battery may be that needs to be changed once used.

In some embodiments, the battery is a rechargeable battery.

In some embodiments, the stylus comprises a connection for charging the battery.

In some embodiments, the battery is an induction rechargeable battery.

In some embodiments, the battery is a Near Field Communication rechargeable battery.

The battery of the stylus can therefore be charged when disposed close to a device with which the stylus communicates through NFC.

In some embodiments, the battery is a Qi rechargeable battery.

In some embodiments, the stylus comprises energy harvesting device for charging the battery.

Example of energy harvesting devices are solar energy harvesting device, mechanical energy harvesting device, electromagnetic energy harvesting device, thermal energy harvesting device. Mechanical energy harvesting devices may be based on the piezoelectric effect. Thermal energy harvesting devices may be based on the Seebeck effect.

In some embodiments, the stylus comprises an induction coil.

The stylus may cooperate with an induction touchscreen. The induction coil may receive power supply from a coil included in an electronic device comprising the touchscreen. As when using a battery, the induction coil, when being power supplied by the touchscreen may be the power supply source of the electronic components and/or of the detector.

In some embodiments, the first part and the second part of the barrel have at least two configurations relative to one another.

In some embodiments, the first part and the second part are configured to move in translation and/or in rotation relative to one another from a first configuration to a second configuration and from the second configuration to the first configuration.

In some embodiments, the stylus comprises a memory unit.

The memory unit is used to store information.

In some embodiments, the memory unit is configured to store information relative to at least a personalization of one actuator.

In some embodiments, the electronic tip has a retracted configuration in which the electronic tip is entirely received in the barrel.

The electronic tip is a retractable tip. It is to be noted that buttons for moving the electronic tip from the retracted configuration to the in-use configuration may not be linked, directly or indirectly, to detector detecting the configuration of the button.

In some embodiments, the barrel comprises a writing tip received at least in part in the barrel, the writing tip having a in-use configuration in which the writing tip is received in part in the barrel and protrudes from the first part of the barrel through the opening and a retracted configuration in which the writing tip is entirely received in the barrel.

In some embodiments, the stylus comprises a haptic feedback device.

The haptic feedback device may be a piezoelectric device generating vibration upon receiving power supply.

For example, the haptic feedback device may give the user a confirmation that the choice or the action realised with the actuator has been detected. The haptic feedback device may also be used to create or to reproduce a certain feeling with the user, such as the feeling of writing on paper with a pencil.

In some embodiments, the stylus comprises a colour scanner.

In some embodiments, a length of the first part of the barrel in the longitudinal direction is equal to or greater than 25 mm (millimetre), specifically equal to or greater than 70 mm and equal to and smaller than 110 mm, specifically equal to and smaller than 90 mm.

In some embodiments, a length of the second part of the barrel in the longitudinal direction is equal to or greater than 30 mm, specifically equal to or greater than 40 mm and equal to and smaller than 110 mm, specifically equal to and smaller than 80 mm.

In some embodiments, the first part comprises a nose cone.

In some embodiments, a length of the nose cone in the longitudinal direction is equal to or greater than 1 mm, specifically equal to or greater than 5 mm and equal to and smaller than 110 mm, specifically equal to and smaller than 80 mm.

In some embodiments, the barrel comprises a flat portion.

The flat portion may be used to support a display, a photovoltaic element and/or to fix electronic components.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments of the disclosure and together with the description, serve to explain the principles thereof.

FIG. 6 is a partial perspective view of a second part of a stylus;

FIGS. 7A-11 show various types of actuators;

FIGS. 12A-13 show various types of display;

FIG. 14 shows an actuator located at the second end of the stylus;

FIG. 15 shows an electric conductive pad located at the second end of the stylus;

FIG. 16 shows a stylus with the first part and the second part of the barrel having at least two configurations relative to one another in the circumferential direction;

FIG. 17 shows a stylus with the first part and the second part of the barrel having at least two configurations relative to one another in the longitudinal direction;

FIGS. 18A-19C show various types of actuators for a clip;

FIGS. 21A-21F show various types of actuators for a first part of the barrel;

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
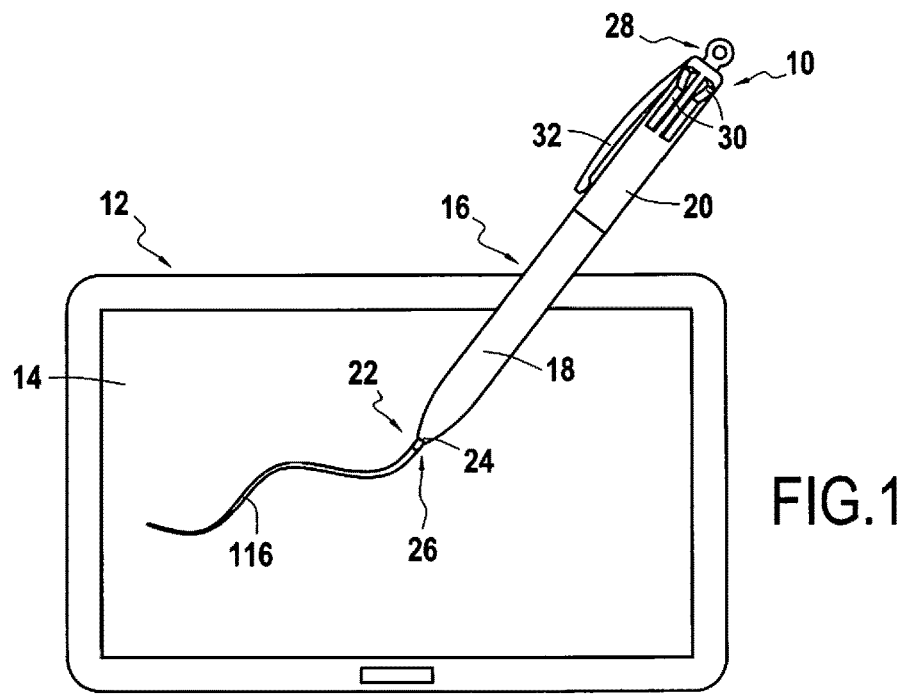
FIG. 1 shows a schematic perspective view of a stylus and a device comprising a touchscreen according to embodiments of the present disclosure.
Figure 2:
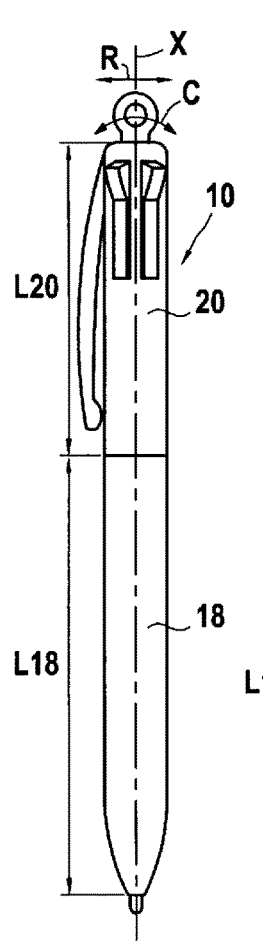
FIG. 2 shows a schematic perspective view of the stylus of FIG. 1 in a user's hand.

FIG. 1 shows a representation of an exemplary stylus 10 according to embodiments of the present disclosure. The stylus 10 is configured to cooperate with a touchscreen 14, such as the touchscreen 14 of a tablet computer 12.

The stylus 10 comprises a barrel 16 extending in a longitudinal direction X.

In general, the longitudinal direction X correspond to the axis X of the barrel 16, a radial direction R is a direction perpendicular to the longitudinal direction X and the circumferential direction C is a direction circling around the longitudinal direction X.

The barrel 16 comprises a first part 18 and a second part 20. The first part 18 and the second part 20 may be two different elements assembled to one another in the longitudinal direction X, the first part 18 and the second part 20 may be two different elements assembled to one another in the radial direction R, or a combination of thereof. The first part 18 and the second part 20 may also be in one piece.

The first part 18 is to be held in the hand of a user. The first part 18 comprises a first end 22 of the barrel 16 having a hole 24 through which an electronic tip 26 protrudes.

In FIG. 1, the electronic tip 26 is in a in-use configuration. The electronic tip 26 may be fixed or the electronic tip 26 may be retractable. When the electronic tip 26 is retractable, in the in-use configuration, the electronic tip 26 is received at least in part in the barrel 16 and the electronic tip 26 protrudes from the first part 18 of the barrel 16 through the opening 24 whereas, in a retracted configuration, the electronic tip 26 is entirely received in the barrel 16, see FIG. 5.

The second part 20 comprises a second end 28, the second end 28 being, in the longitudinal direction X, opposed to the first end 22. In the embodiment of FIG. 1, the second part 20 comprises four actuators positioned in the circumferential direction C relative to one another, only three being visible. The actuators are slide buttons 30 extending in the longitudinal direction X. The second part 20 also comprises a clip 32.

A length L18 of the first part 18 of the barrel 16 in the longitudinal direction X is equal to 80 mm and a length L20 of the second part 20 of the barrel 16 in the longitudinal direction X is equal to 70 mm.

Figure 3:
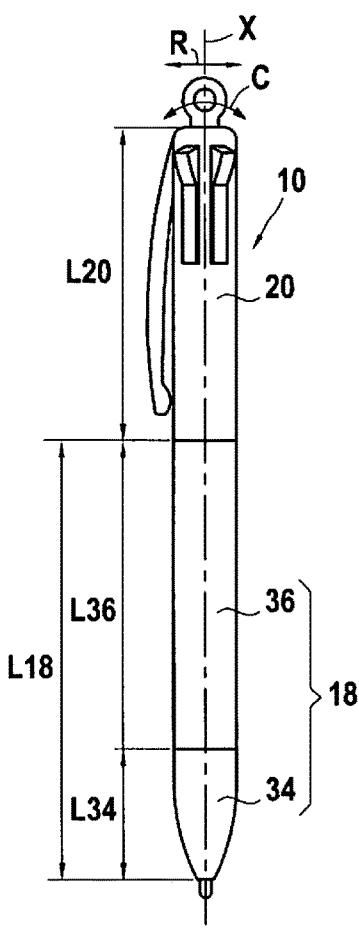
FIG. 3 shows a schematic perspective view of a stylus according to embodiments of the present disclosure.

FIG. 3 shows a stylus 10 in which the first part 18 comprises a nose cone 34 and an intermediate barrel 36. A length L34 of the nose cone 34 of the first part 18 of the barrel 16 in the longitudinal direction X is equal to 10 mm and a length L36 of the intermediate barrel 36 of the first part 18 of the barrel 16 in the longitudinal direction X is equal to 70 mm.

Figure 4:
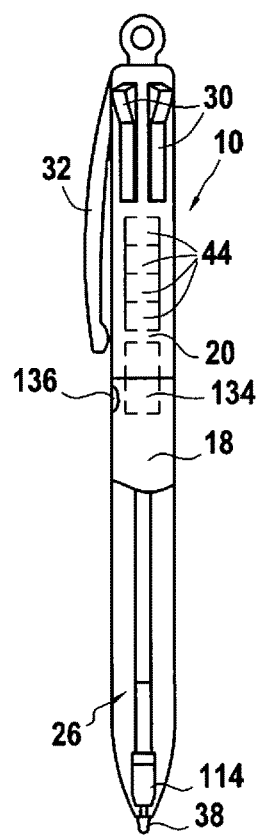
FIG. 4 is a cut away view of the stylus of FIG. 1.

As can be seen on the cut away view of FIG. 4, the electronic tip 26 is an assembly of an end tip 38 connected to an electronic printed board 40 comprising a plurality of electronic components 42. The electronic printed board 40 may be flexible.

The electronic components 42 may improve the detection of the position of the end tip 38 relative to the touchscreen 14.

The stylus 10 comprises four detectors 44, each detector 44 detecting the configuration of one slide button 30. For example, the detectors 44 may be microcontrollers programmed to detect the state of the actuators. The detectors 44 are connected to the actuators, directly or indirectly. Non-limiting examples of direct connection are pins, ribbon cables, cables, metallic conductive strips or Molded Interconnect Device (MID). Non-limiting examples of indirect connection through a communication protocol using a multiplexer/demultiplexer. The multiplexer/demultiplexer reduces the need for contacts and allows for space saving.

The detectors 44 may be on the electronic printed board 40 connected to the end tip 38. On FIG. 27, the detectors 44 are on the electronic printed board 40. However, the detectors 44 may also be on a separate electronic printed board.

The electronic components 42 are connected to the detectors 44. The electronic components 42 include communication components 46 for communicating with the device 12 comprising the touchscreen 14. The communication between the device 12 and the stylus 10 may be a wireless communication, such as electromagnetic waves, for example, WiFi, Bluetooth, NFC, or such as light waves, for example, LiFi, infrared, or mechanical waves, for example ultrasound waves or audible sounds. The communication components 46 are configured to send information detected by the detectors 44 relative to the configuration of the actuators.

In some embodiments, the stylus 10 may comprise an inclination detector 48. The inclination detector 48 may be a tilt switch or a gyroscope or an inclination detector comprising a moving part.

In some embodiments, the stylus 10 may also comprise a motion detector 50, for example an inertial measurement unit ("IMU") allowing for measuring the orientation and the movement with nine degrees of freedom. Such an inertial measurement unit comprises accelerometer with three degrees of freedom, a gyroscope with three degrees of freedom and a magnetometer with three degrees of freedom. The motion detector 50 may be disposed on the electronic printed board 40.

Figure 5:
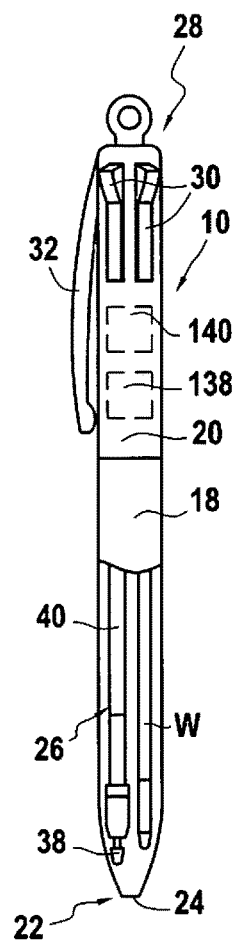
FIG. 5 is a cut away view similar to FIG. 4 of a stylus comprising a writing tip.

As shown on FIG. 5, the electronic tip 6 may have a retracted configuration in which the electronic tip 6 is entirely received in the barrel 16. Thus, the electronic tip 26 is a retractable tip, i.e., the electronic tip 26 has the in-use configuration in which the electronic tip 26 protrudes from the first part 18 of the barrel 16 through the opening 24, shown on FIG. 4, and the retracted configuration in which the electronic tip 6 is entirely received in the barrel 16, shown on FIG. 5.

As also shown on FIG. 5, the barrel 16 comprises a writing tip W received at least in part in the barrel 16. The writing tip W may take a in-use configuration in which the writing tip W is received in part in the barrel 16 and protrudes from the first part 18 of the barrel 16 through the opening 24 and a retracted configuration in which the writing tip W is entirely received in the barrel 16, as shown on FIG. 5.

FIG. 6 shows the second part 20 of the stylus 10. In particular, the slide buttons 30 may be actuated in the longitudinal direction X, more specifically in the embodiment of FIG. 6, the slide buttons 30 are actuated in translation along the longitudinal direction X by displacement of the slide buttons 30 in translation along the longitudinal direction X.

Each slide button 30 may be activated independently from the other slide buttons 30.

Each slide button 30 may be stable in each configuration it may take or each slide button 30 may not be stable in each configuration it may take. There may also be a mix of stable slide button(s) 30 with non-stable slide button(s) 30.

Each slide button 30 may take at least two configurations. Each slide button 30 may take more than two configurations. Each slide button 30 may take a different number of configurations than the other slide buttons 30. One or more slide buttons 30 may have the same number of configurations.

For example, one slide button 30 is stable and has two configurations, i.e., the slide button 30 has a first configuration shown in FIG. 7A and a second configuration shown in FIG. 7B. When the slide button 30 is either in the first configuration or in the second configuration, the slide button 30 is stable, i.e., the slide button 30 does not move unless actuated by a user. To move from the first configuration to the second configuration, the user actuates the slide button 30 in the direction of the arrow 52 in FIG. 52 and conversely, to move the second configuration to the first configuration, the user actuates the slide button 30 in the direction of the arrow 54 in FIG. 7B.

For example, one slide button 30 is not stable and has two configurations, i.e., the slide button 30 has a first configuration shown in FIG. 7A and a second configuration shown in FIG. 7B. When the slide button 30 is stable in the first configuration and not stable in the second configuration, i.e., the slide button 30 has a default configuration, in this case the first configuration, which the slide button 30 takes back after being actuated in the second configuration, without interaction of a user. To move from the first configuration to the second configuration, the user actuates the slide button 30 in the direction of the arrow 52 in FIG. 52, the slide button 30 takes the second configuration and, upon release from the user, the slide button 30 moves back to the first configuration, without interaction of the user. The stylus 10 may comprise a biasing element for returning the slide button 30 in the stable configuration, in this case, the first configuration.

It is understood that the first configuration may be a non-stable configuration and the second configuration may be a stable configuration, the second configuration is the default configuration.

Although, when not activated by a user, the slide button 30 is in the default configuration, the slide button 30 may have different status in the default configuration, for example, the slide button 30 may pass from a "on" status to a "off" status upon a first actuation and from the "off" status to the "on" status upon a second actuation. It is possible to have more than two statuses.

The slide button 30 may also be configured to be actuated in the radial direction R towards the axis X, as shown on FIG. 7C. Thus, the slide button 30 may also be a push button 56. Typically, for such actuation, the push button 56 has a first configuration which is a default configuration in which the push button 56 is stable and a second configuration in which the push button 56 is pressed towards the axis X in the radial direction R in which the push button 56 is not stable. Upon release by the user of the push button 56, the push button 56 moves back to the first configuration.

The slide button 30 may also be actuated in the circumferential direction C, as shown on FIG. 7D. For example, the slide button 30 may be moved or pressed in the circumferential direction either in the direction of the arrow 58 or in the direction of the arrow 60. Generally, the slide button 30 has a first configuration which is a default configuration in which the slide button 30 is stable and two configurations in which the slide button 30 is pressed towards the circumferential direction C, either in the direction of the arrow 58 or in the direction of the arrow 60, in which the push button is not stable. Upon release by the user of the slide button 30, the slide button 30 moves back to the first configuration.

It is understood that each slide button 30 may be configured to be actuated according to FIGS. 7A-7D. However, all the actuations may not be possible on each slide button 30. Some slide buttons 30 may be displaced only in translation along the longitudinal direction X. Some slide buttons 30 may be actuated in translation along the longitudinal direction X and may be actuated in the circumferential direction C. Some slide buttons 30 may be actuated in translation along the longitudinal direction X and in the radial direction R. All combinations are encompassed. Moreover, one slide button 30 may have a configuration different from the other slide buttons 30.

The slide button 30 may also have more than two configurations in the longitudinal direction X. As shown on FIG. 8, the slide button 30 has three configurations. A first configuration which is a default configuration in which the slide button 30 is stable and two configurations in which the slide button 30 is pressed along the longitudinal direction X, either in the direction of the arrow 62 or in the direction of the arrow 64, in which the push button is not stable. Upon release by the user of the slide button 30, the slide button 30 moves back to the first configuration shown on FIG. 8. The slide button 30 may also be stable in the three configurations.

It is to be understood that the configurations described for the slide button 30 of FIGS. 7C-D are also possible options for the slide button 30 of FIG. 8.

When the slide button 30 is stable in all the configurations it takes, it is possible to have more than three configurations for the slide button 30. The slide button 30 may also take different configurations in continuous, i.e., the slide button 30 may be moved continuously from the configuration of FIG. 7A to the configuration of FIG. 7B, each position of the slide button 30 being a stable configuration. The latter slide button 30 is a proportional actuator.

The actuator may be a rock button 66. The rock button 66 is configured to be actuated in the radial direction R towards the axis X, as shown on FIG. 9.

The rock button 66 has a first configuration which is a default configuration in which the rock button 66 is stable, a second configuration in which the rock button 66 is pressed towards the axis X in the radial direction R in the direction of the arrow 68 in which the rock button 66 is not stable and a third configuration in which the rock button 66 is pressed towards the axis X in the radial direction R in the direction of the arrow 70 in which the rock button 66 is not stable. Either in the second configuration or in the third configuration, upon release by the user of the rock button 66, the rock button 66 moves back to the first configuration.

The three configurations may be stable configurations. The rock button 66 may also have two stable configurations, a first configuration in which the rock button 66 is pressed towards the axis X in the radial direction R in the direction of the arrow 68 and a second configuration in which the rock button 66 is pressed towards the axis X in the radial direction R in the direction of the arrow 70.

It is to be understood that the configurations described for the slide button 30 of FIGS. 7C-D are also possible options for the rock button 66 of FIG. 9.

The actuator may be wheel 72, as shown on FIG. 10. The wheel 72 is configured to be actuated in the longitudinal direction X in rotation either in the direction of the arrow 74 and/or in the direction of the arrow 76.

The wheel 72 may be configured to take multiple discrete or continuous configurations.

It is to be understood that the configurations described for the slide button 30 of FIGS. 7C-D are also possible options for the wheel 72 of FIG. 10.

The actuator may comprise a touch sensitive surface 78. The touch sensitive surface 78 may be for example a capacitive surface or a resistive surface. The touch sensitive surface 78 may be actuated along the longitudinal direction X, along the circumferential direction C and/or along the radial direction R, for example, by displacement of a finger of a user along the touch sensitive surface 78. The touch sensitive surface 78 may be a proportional actuator.

The actuator may be a combination of the above non-limitative list of actuators. As described, the slide button may also be a push button. The sensitive surface may also be a push button, etc.

The actuator may comprise a display, such as a LCD screen display 80, as shown on FIGS. 12A and 12B. The LCD screen may display information related to the configuration in which the actuator is in, for example a colour (FIG. 12A) or other information related to a given actuator (FIG. 12B). Alternatively, the display may be a E-Ink display.

The barrel 16 may comprise a display, such as a LED 82, as shown on FIG. 13. The LED 82 may be disposed close to the actuator and show the configuration the actuator is in.

As shown on FIG. 12, the second end 28 of the second part 20 comprises a push button 84. The push button 84 is configured to be actuated in the longitudinal direction X. Typically, for such actuation, the push button 84 has a first configuration which is a default configuration in which the push button 84 is stable and a second configuration in which the push button 84 is pressed towards the first end 22 in the longitudinal direction X in which the push button 84 is not stable. Upon release by the user of the push button 84, the push button 84 moves back to the first configuration.

The push button 84 may comprises a display, such as a LCD screen display, a E-Ink display or a LED.

As shown on FIG. 15, the second end 28 of the second part 20 comprises an electric conductive pad 86. The electric conductive pad 86 may be an end electronic tip.

As shown on FIG. 16, in some embodiments, the first part 18 and the second part 20 may be configured to move in rotation in the circumferential direction C relative to one another from a first configuration indicated by an indicator 88 disposed on the second part 20 and aligned with a first marker 90 disposed on the first part 18 on FIG. 16 to a second configuration indicated by a second marker 92 disposed on the first part 18. The first part 18 and the second part 20 may also move from the second configuration to the first configuration. The embodiment is not limited to two configurations. The number of configurations is only given as a non-limitative example.

As shown on FIG. 17, in some embodiments, the first part 18 and the second part 20 may be configured to move in translation in the longitudinal direction X relative to one another and take different configurations indicated by markers 94 disposed on the second part 20. The number of configurations is only given as a non-limitative example.

It is understood that the first part 18 and the second part 20 may be configured to move both in rotation in the circumferential direction C relative to one another and in translation in the longitudinal direction X relative to one another.

As shown on FIGS. 18A-18B, the clip 32 may be an actuator. The clip 32 may be actuated in the radial direction R and/or in the circumferential direction C.

Figure 19A:
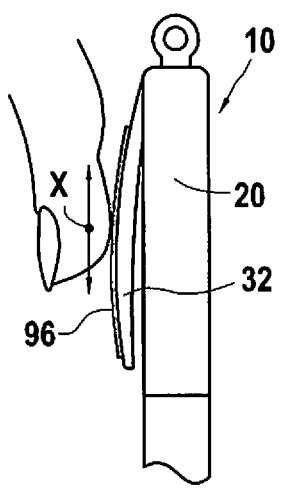
Figure 19B:
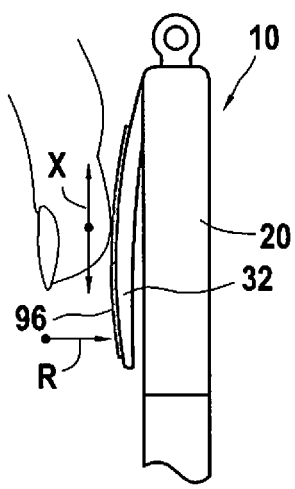
Figure 19C:
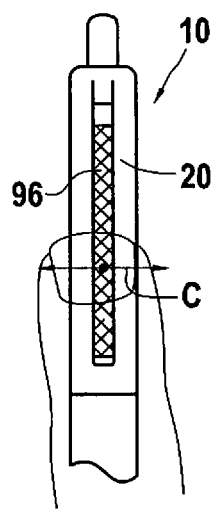

As shown on FIGS. 19A-19C, the clip 32 may comprises a touch sensitive surface 96. The touch sensitive surface 96 may be for example a capacitive surface or a resistive surface. The touch sensitive surface 96 may be actuated along the longitudinal direction X, along the circumferential direction C and/or along the radial direction R. For example, the touch sensitive surface 96 may be a proportional actuator in the longitudinal direction X.

Figure 20A:
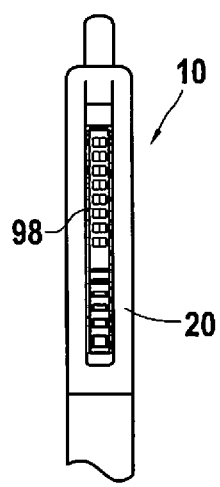
FIGS. 20A-20B show various types of display for a clip.

The clip 32 may comprise a display, such as a LCD screen display 98, as shown on FIG. 20A. The LCD screen may display information related to the configuration in which the actuator is in, for example a colour or other information. Alternatively, the display may be an E-Ink display.

Figure 20B:
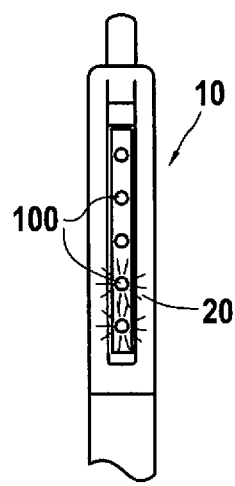

The clip 32 may comprise a display, such as a LED 100, or a plurality of LED 100, as shown on FIG. 20B.

As shown on FIGS. 21A-21F, the first part 18 of the barrel 16 may comprise an actuator.

Any type of actuator described in connexion with the second part 20 of the barrel 16 may be also implemented in the first part 18 of the barrel 16, of which some non-limitative embodiments are shown in FIGS. 21A-21F.

In FIG. 21A, the first part actuator is a ring 102 configured to be rotated in the circumferential direction.

In FIG. 21B, the first part actuator is a ring 104 with a touch sensitive surface.

In FIG. 21C, the first part actuator is a slide button 106 similar to the slide button 30 of FIGS. 7A-7B.

In FIGS. 21D and 21F, the first part actuator is a touch sensitive surface 108 similar to the touch sensitive surface 78 of FIG. 11.

In FIG. 21E, the first part actuator is a press button 110 similar to the press button 84 of FIG. 14.

The first part 18 of the barrel 16 may comprise more than one actuator, and actuators of different types.

Figure 22:
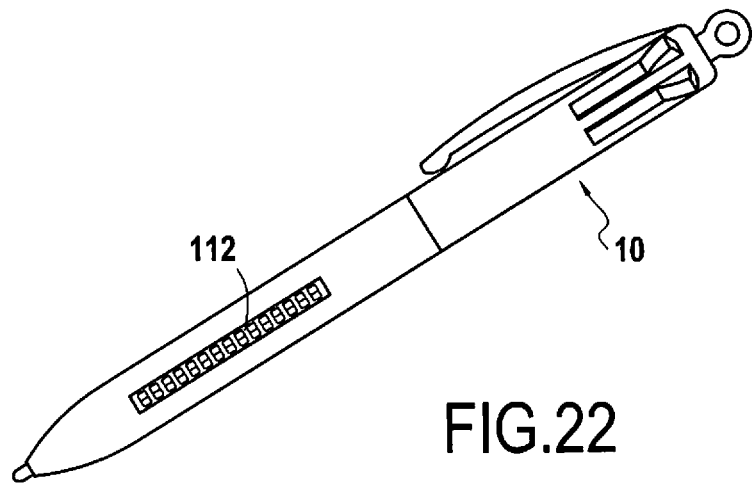
FIG. 22 shows a display on the first part of the barrel.

The first part 18 of the barrel 16 may comprise a display, such as a LCD screen display 112 or a E-Ink display, see FIG. 22. The LCD screen display 112 may be disposed on a flat portion of the stylus 10.

Figure 23A:
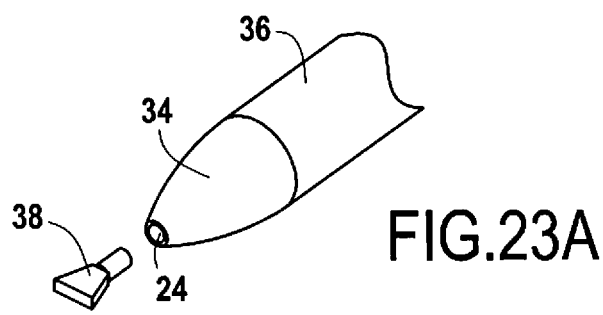
FIGS. 23A-23D show various types of end tips.

As shown on FIG. 23A, the end tip 38 is detachable.

Figure 23B:
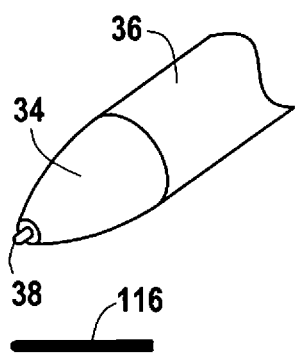
Figure 23C:
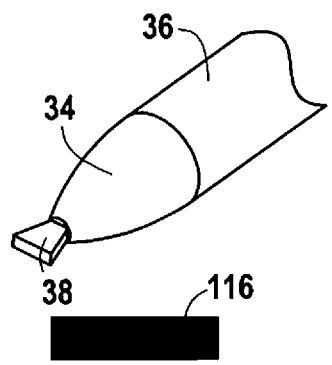
Figure 23D:
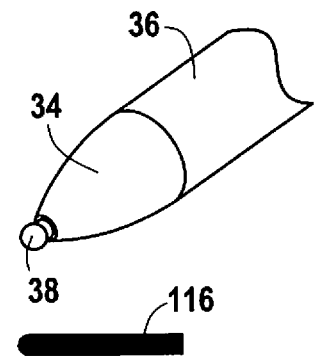

The end tip 38 may be detached from the stylus 10 and may be replaced by another end tip 38. The other end tip 38 may have a different end tip shape and/or size, as shown in FIGS. 23B-23D. The other end tip 38 may be made of a different material and/or have a different density so the feeling of the user is different from the feeling with the previous end tip 38.

The stylus may comprise a pressure sensor tip unit 114 (see FIG. 4). The pressure sensor tip unit 114 allows for recording the pressure applied by a user to the end tip 38 of the stylus 10. This information may be transmitted to the unit 12 comprising the touchscreen 14, so that a thickness of the line drawn 116 on the touchscreen 14 is proportional to the pressure exerted on the end tip 38, i.e., the greater the pressure, the greater the thickness of the line drawn (see FIG. 1).

The possible interactions between the touchscreen 14 and the stylus 10 are going to be described.

The stylus 10 may cooperate with the touchscreen 14 of the device 12 by having a specific application installed on the device 12 or by being compatible with the native operating system of the device 12.

Figure 24:
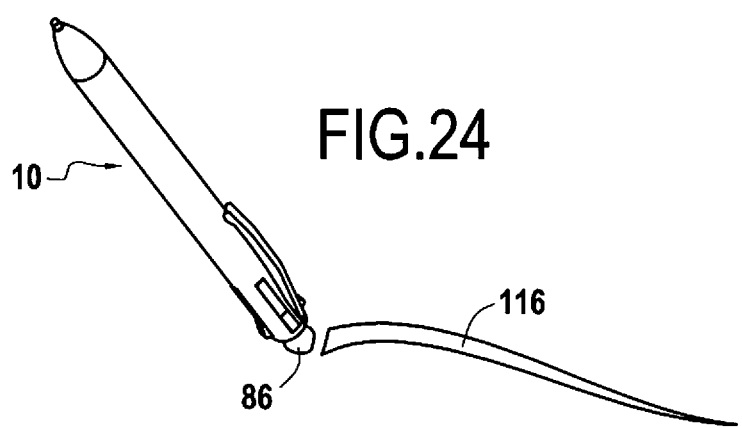
FIGS. 24-26 show various types of interaction between the stylus and the device comprising the touchscreen.

For example, when the second end 28 of the second part 20 comprises an electric conductive pad 86. The electric conductive pad 86 may be recognised by the touchscreen 14 as an eraser (see FIG. 24).

The actuators may be used to select colors or tools (highlither, pencil, mechanical pencil, brush) or functions, such as drawing thickness variation, opacity variation, saturation variation, pattern variation, application option setup, tools options setup, application shortcuts (copy/paste, save, zoom, etc.), etc. This list is non limitative.

IMU may allow for advances functions such as the thickness of the line drawn that may vary as a function of the speed of displacement of the end tip 38 on the touchscreen 14.

The push button 84 disposed at the second end 28 of the second part 20 of the barrel may be used as an eraser, i.e., when activated, the stylus 10 would not make line on the touchscreen 14 but would erase lines and drawings on the touchscreen 14. A LED disposed on the push button 84 may tell the user whether the "erase" function is "on" or "off".

The push button 84 may be a time proportional selector. Upon a short actuation, i.e., less than 1 second, the push button 84 switches between the "on"/"off" status, while upon a long actuation, i.e., more than 2 seconds, the push button may trigger another action. The other action may be an "undo" action, or a "save" action. The "save" action may be the action of saving the current drawing and/or text displayed on the touchscreen 14. The "save" action may also be the action of saving the current status of all the actuators or the personalization of the actuators that has been chosen by the user. The "save" action may be related to one actuator at a time, in general the actuator for which the status has been changed the most recently or to a group of actuators. The "save" action may save the information in a memory unit 132, which is part of the electronic printed board 40.

The time proportional selector may be implemented with any type of actuator.

Figure 25A:
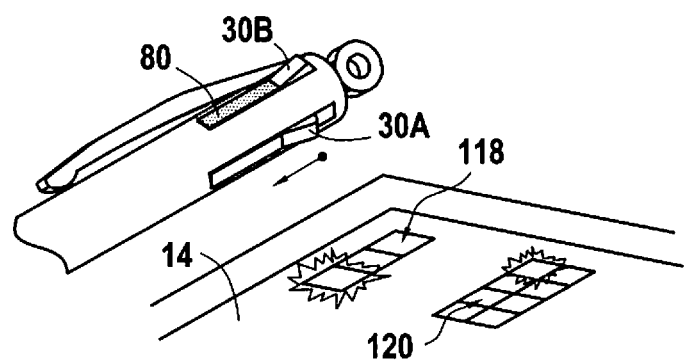

FIG. 25A shows an example of for two slide buttons 30A, 30B which are not stable and each have two configurations, i.e., the slide buttons 30A, 30B have a first configuration shown in FIG. 7A and a second configuration shown in FIG. 7B. When the slide buttons 30A, 30B are stable in the first configuration and not stable in the second configuration, i.e., the slide buttons 30A, 30B have a default configuration, in this case the first configuration, which the slide buttons 30A, 30B take back after being actuated in the second configuration, without interaction of a user.

The slide button 30A may have three statuses in the default configuration, for example, for selecting a tool in the part 118 of the touchscreen 14 and the slide button 30A may pass from one status to another upon successive actuations of the slide button 30A.

The slide button 30B may have height statuses in the default configuration, for example, for selecting, in the part 120 of the touchscreen 14, a texture of the line to be drawn and the slide button 30B may pass from one status to another upon successive actuations of the slide button 30A.

FIG. 25A may also show an example of for two slide buttons 30A, 30B which are stable, the slide button 30A having three configurations and the slide button 30B having height configurations.

It is understood that each button 30A, 30B may be actuated independently from one another.

Figure 25B:
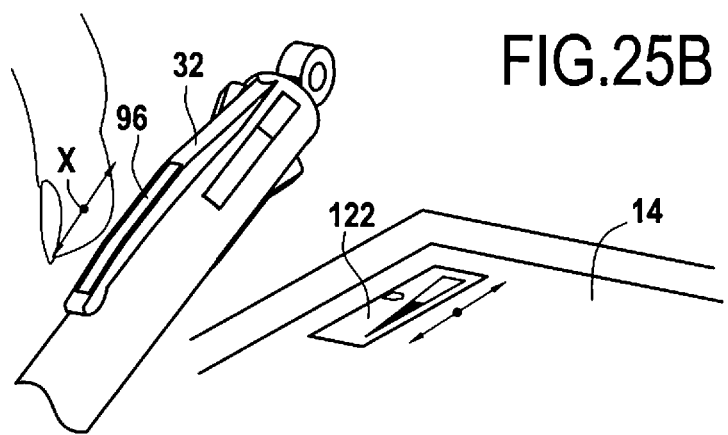
Figure 25C:
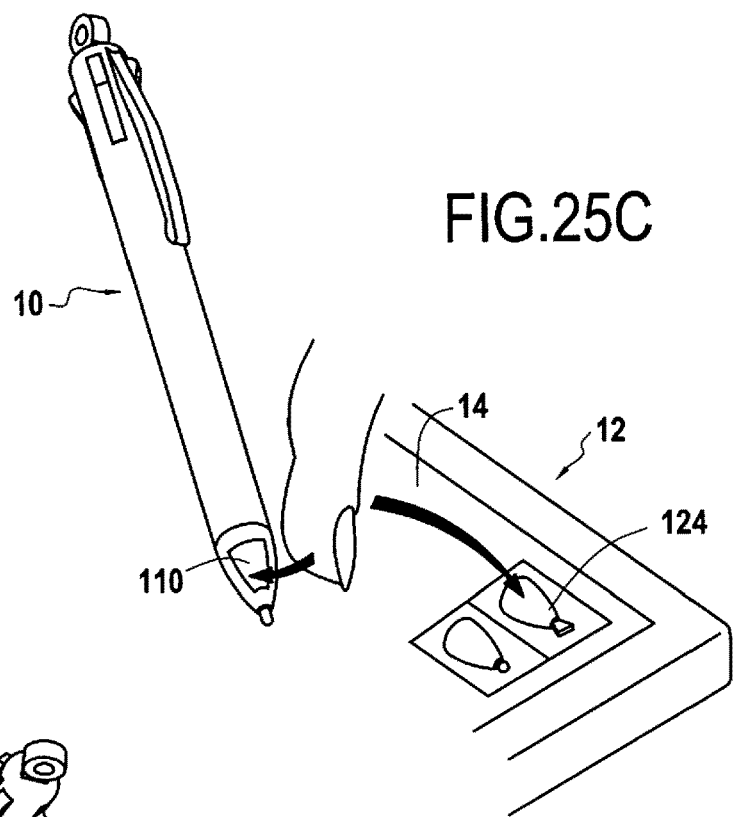

FIG. 25B shows the clip 32 having a touch sensitive surface 96. The touch sensitive surface 96 of the clip may be used to select, in the part 122 of the touchscreen 14, the thickness of the line to be drawn.

Figure 26:
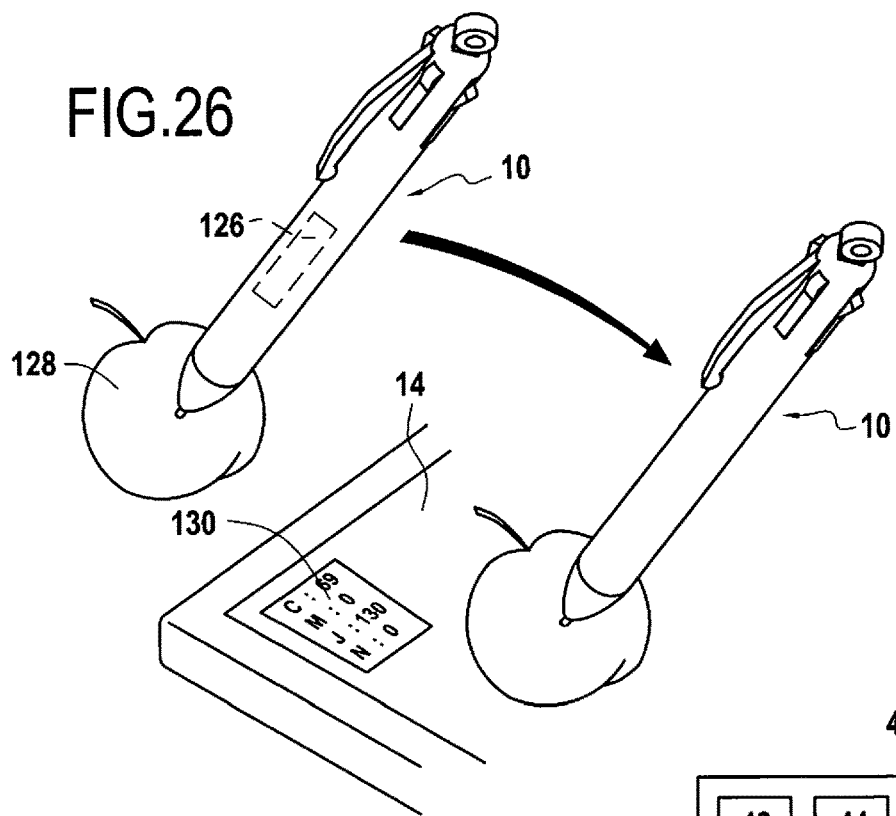

FIG. 26 shows the first part 18 having a push button 110 allowing, upon actuation, to switch from one end tip to another in the part 124 of the touchscreen.

The stylus 10 may also comprise a color scanner 126 allowing to sample the color of an object, such as an apple 128 for example, the stylus 10 may then be capable of communicating the scanned color to the device 12 and to display it in a part 130 of the touchscreen 14 and to allow the user to fill a form with the scanned color.

The stylus 10 may also comprise a battery 134 (see FIG. 4) for power supply of the electronic printed board 40 and the components requesting energy.

The battery 134 may be a rechargeable battery. The stylus may comprise a connection 136 for charging the battery 134.

The battery 134 may be an induction rechargeable battery, a Near Field Communication rechargeable battery and/or an energy harvesting battery.

The stylus 10 may comprise an induction coil 138 (see FIG. 5). The stylus 10 may cooperate with an induction touchscreen. The induction coil 138 may receive power supply from a coil included in an electronic device comprising the induction touchscreen. As when using a battery, the induction coil 138, when being power supplied by the touchscreen may be the power supply source of the electronic components and/or of the detector.

The stylus may comprise a haptic feedback device 140 (see FIG. 5). The haptic feedback device 140 may be a piezoelectric device generating vibration upon receiving power supply.

For example, the haptic feedback device 140 may give the user a confirmation that the choice or the action realised with the actuator has been detected. The haptic feedback device 140 may also be used to create or to reproduce a certain feeling with the user, such as the feeling of writing on paper with a pencil.

Figure 27:
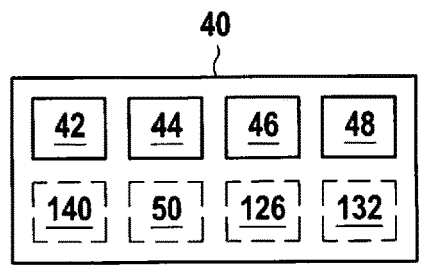
FIG. 27 shows an electronic printed board according to embodiments of the present disclosure.

FIG. 27 represent the electronic printed board 40 connected to the end tip 38 of FIG. 4. The electronic printed board 40 may be flexible.

The electronic printed board 40 comprises electronic components 42 for improving the detection of the position of the end tip 38 relative to the touchscreen 14.

The electronic printed board 40 may comprise the detectors 44. Although only one detector 44 is represented on FIG. 27, it is understood that the electronic printed board 40 may comprise as many detectors 44 as required.

The electronic printed board 40 may comprise the communications components 46. The electronic printed board 40 may comprise the inclination detector 48 and/or the motion detector 50.

The electronic printed board 40 may comprise the color scanner 126 and the electronic parts for the color scanner to communicate with the stylus 10, the memory unit 132 and/or the haptic feedback device.

It is understood that each of the components represented with a dash line on FIG. 27 need not to be present on the electronic printed board 40 which is connected to the end tip 38. Indeed, each of the components represented with a dash line on FIG. 27 may be disposed on separate electronic printed board(s). The separate electronic printed board(s) may be connected directly or indirectly. Non-limiting examples of direct connection are pins, ribbon cables, cables, metallic conductive strips or Molded Interconnect Device (MID). Non-limiting examples of indirect connection through a communication protocol using a multiplexer/demultiplexer. The multiplexer/demultiplexer reduces the need for contacts and allows for space saving.

Moreover, it is to be understood that not all of these components are requested to be present in the stylus 10.

For example, the inclination detector 48, the motion detector 50, the color scanner 126, the memory unit 132 and/or the haptic feedback device 140 may be omitted in the stylus 10, depending on the desired functions of the stylus.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A stylus for a touchscreen comprising:
   a barrel extending in a longitudinal direction, the barrel comprising:
      a first end comprising an opening and a second end, the first end and the second end being, in the longitudinal direction, opposite to one another, and
      a first part and a second part, the first part including the first end and the second part including the second end;
   a first electronic tip received at least in part in the barrel and configured to have at least an in-use configuration in which the first electronic tip protrudes from the first part of the barrel through the opening;
   an electric conductive pad or a second electronic tip extending outwardly from the second end;
   at least two actuators positioned in a circumferential direction relative to one another on the second part of the barrel, the at least two actuators extending in the longitudinal direction, being configured to be actuated independently from the other actuators and having at least two configurations;

at least a detector for detecting the configuration of the at least two actuators;

communication components configured to send information relative to the configuration of the at least two actuators; and a memory unit, wherein the memory unit is configured to store information relative to at least a personalization of at least one actuator, wherein the personalization includes a characteristic of the first electronic tip perceived by the touchscreen upon contact of the first electronic tip with the touchscreen.

2. The stylus according to claim 1, wherein the second end comprises at least a second part actuator.

3. The stylus according to claim 1, wherein the first part of the barrel comprises a first part actuator.

4. The stylus according to claim 1, wherein the first part and the second part of the barrel have at least two configurations relative to one another.

5. The stylus according to claim 1, wherein the barrel and/or at least one actuator comprise a display.

6. The stylus according to claim 1, wherein the electronic tip has a retracted configuration in which the electronic tip is entirely received in the barrel, wherein the barrel comprises a writing tip received at least in part in the barrel, the writing tip having an in-use configuration in which the writing tip is received in part in the barrel and protrudes from the first part of the barrel through the opening and a retracted configuration in which the writing tip is entirely received in the barrel.

7. The stylus according to claim 1, wherein a longitudinal distance between an edge of the first electronic tip and an edge of the electric conductive pad or the second electronic tip is a largest measurable longitudinal distance of the stylus.

8. The stylus according to claim 7, wherein the electric conductive pad or the second electronic tip is configured to be recognized as an eraser by the touchscreen.

9. The stylus according to claim 8, wherein the stylus comprises an inclination detector.

10. A method of using the stylus according to claim 8, the method including:
contacting the first electronic tip with a surface of the touchscreen along a first path to cause the touchscreen to display a mark corresponding to the first path;
contacting the electric conductive pad or the second electronic tip with the surface of the touchscreen along a second path, wherein at least a portion of the second path overlaps with the first path, to cause the touchscreen to remove the mark along any portion of the second path that overlaps with the first path.

11. The method of claim 10, wherein the touchscreen automatically recognizes the electric conductive pad or the second electronic tip as an eraser that causes the touchscreen to remove marks or images from areas of the touchscreen contacted by the electric conductive pad or the second electronic tip.

12. The stylus according to claim 1, wherein at least one of the at least two actuators comprises a touch sensitive surface configured to be actuated along the longitudinal direction, along the circumferential direction and/or along a radial direction.

13. The stylus according to claim 1, further including a color scanner configured to determine a color of an object, wherein the stylus is configured to convey the color of the object scanned by the color scanner to the touchscreen.

14. A stylus for a touchscreen comprising:
a barrel extending in a longitudinal direction, the barrel comprising:
a first end comprising an opening and a second end, the first end and the second end being, in the longitudinal direction, opposite to one another, and
a first part and a second part, the first part including the first end and the second part including the second end;
a first electronic tip received at least in part in the barrel and configured to have at least an in-use configuration in which the first electronic tip protrudes from the first part of the barrel through the opening;
at least two actuators positioned in a circumferential direction relative to one another on the second part of the barrel, the at least two actuators extending in the longitudinal direction, being configured to be actuated independently from the other actuators and having at least two configurations;
at least a detector for detecting the configuration of the at least two actuators; and
communication components configured to send information relative to the configuration of the at least two actuators,
wherein the second part comprises a clip, the clip being an actuator and the clip comprising a display, wherein the clip includes a touch sensitive surface including either a capacitive surface or a resistive surface, wherein the touch sensitive surface is actuatable by displacement of a finger across the touch sensitive surface.

15. The stylus according to claim 1, wherein at least one actuator is configured to be actuated:
in the longitudinal direction;
in translation or in rotation;
in the circumferential direction; or
in a radial direction.

16. The stylus according to claim 14, wherein the display is an LCD, LED, or e-ink display configured to display information related to a configuration of the actuator.

17. A touchscreen stylus comprising a barrel extending in a longitudinal direction, wherein the barrel comprises:
a first end including an opening and a second end opposite to the first end in the longitudinal direction,
a first part including the first end and a second part including the second end;
a first electronic tip received at least in part in the barrel and configured to have at least an in-use configuration in which the first electronic tip protrudes from the opening of the first part of the barrel;
two or more actuators positioned on the second part of the barrel, in a circumferential direction relative to one another, each actuator extending in the longitudinal direction, being configured to be actuated independently from the other actuators and having at least two configurations;
at least a detector for detecting the configuration of the actuators;
communication components configured to send information relative to the configuration of the actuators; and
a memory unit configured to store information relating to a personalization of at least one of the two or more actuators, wherein the personalization includes a characteristic of the first electronic tip perceived by the touchscreen upon contact of the first electronic tip with the touchscreen.

18. The stylus according to claim 17, wherein the electronic tip has a retracted configuration in which the electronic tip is entirely received in the barrel, wherein the barrel comprises a writing tip received at least in part in the barrel, the writing tip having an in-use configuration in which the writing tip is received in part in the barrel and protrudes from the opening of the first part of the barrel and a retracted configuration in which the writing tip is entirely received in the barrel.

19. The stylus according to claim 17, wherein actuation of one of the two or more actuators is configured to cause the memory unit to store a drawing or text displayed on the touchscreen.

\* \* \* \* \*